United States Patent [19]

Volin

[11] Patent Number: 4,500,109

[45] Date of Patent: Feb. 19, 1985

[54] WHEELCHAIR WIDTH ADJUSTER

[76] Inventor: Frank Volin, Columbia, S.C.

[21] Appl. No.: 450,068

[22] Filed: Dec. 15, 1982

[51] Int. Cl.³ .................... B62B 11/00

[52] U.S. Cl. .................... 280/650; 74/526; 280/289 WC; 297/338; 297/DIG. 4

[58] Field of Search .................... 280/650, 647, 638, 639, 280/242 WC, 289 WC, 43.12; 297/DIG. 4, 338, 345, 45; 74/519, 522, 523, 526, 102; 254/120, 131

[56] References Cited

U.S. PATENT DOCUMENTS

| | | | |
|---|---|---|---|
| 2,824,597 | 2/1958 | Lerman | 280/242 WC |
| 3,013,437 | 12/1961 | Harding | 74/522 |
| 3,122,395 | 2/1964 | Offner | 297/DIG. 4 |
| 3,331,614 | 7/1967 | McClintock | 297/45 |
| 3,618,968 | 11/1971 | Greer | 280/242 WC |
| 3,982,767 | 9/1976 | Larsson | 280/43.12 |
| 4,057,218 | 11/1977 | Wallace | 74/523 |
| 4,264,085 | 4/1981 | Volin | 280/289 WC |
| 4,324,410 | 4/1982 | Perego | 280/650 |

*Primary Examiner*—Joseph F. Peters, Jr.
*Assistant Examiner*—Joseph G. McCarthy
*Attorney, Agent, or Firm*—B. P. Fishburne, Jr.

[57] ABSTRACT

The width of a laterally foldable wheelchair can be reduced by the chair occupant by manipulation of a hand lever on one side of the chair frame which is operable to elevate a flexible seat support member thereby inducing partial folding of the chair to reduce its width. The weight of the occupant on the chair seat tends to bias the hand lever toward its inactive stowed position.

8 Claims, 10 Drawing Figures

FIG.4
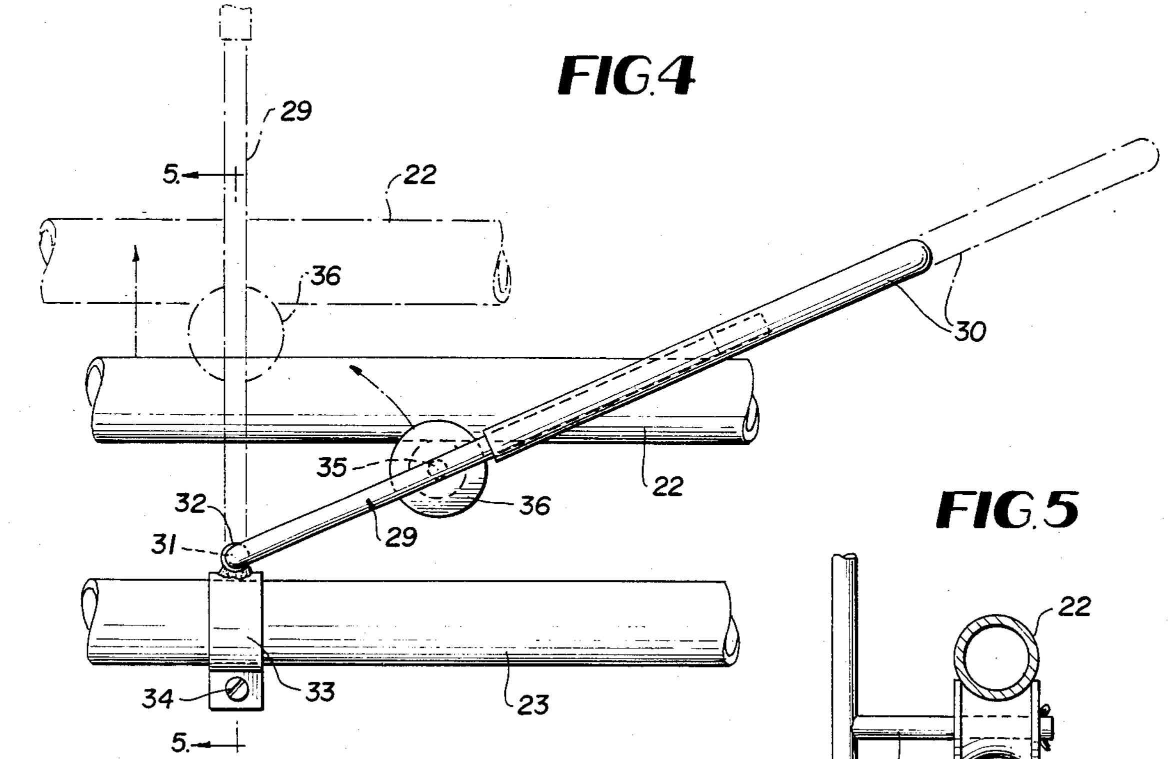
FIG.5
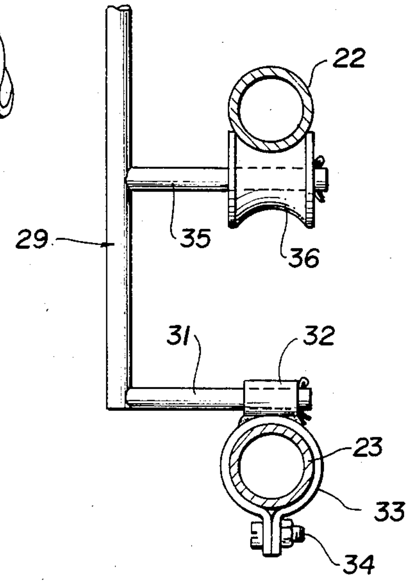
FIG.6
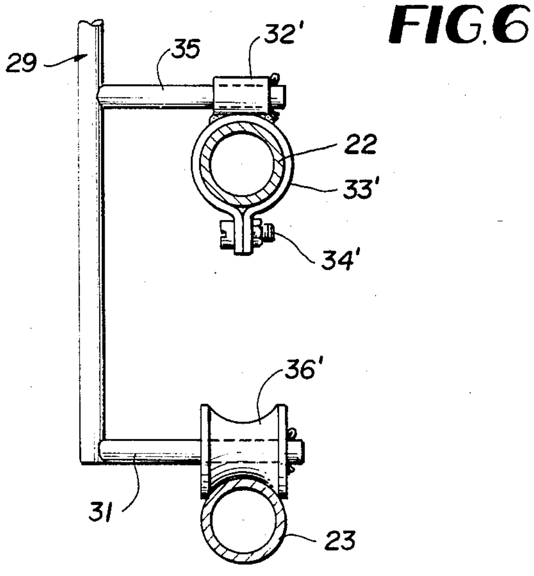
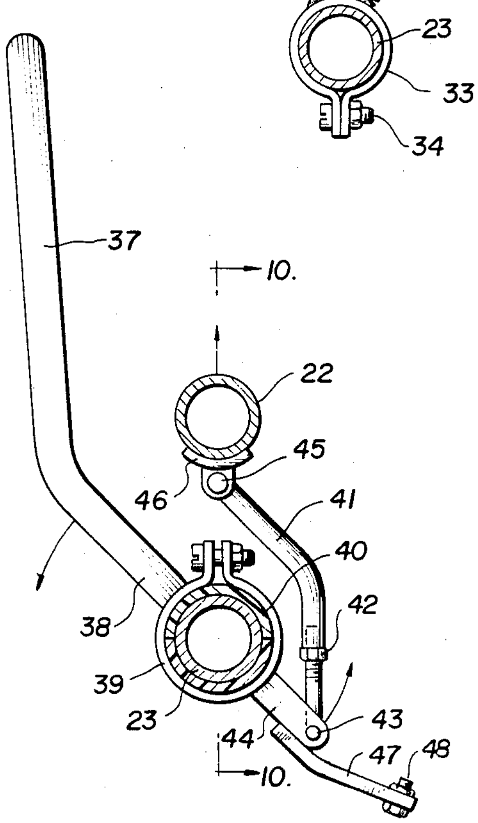
FIG.7

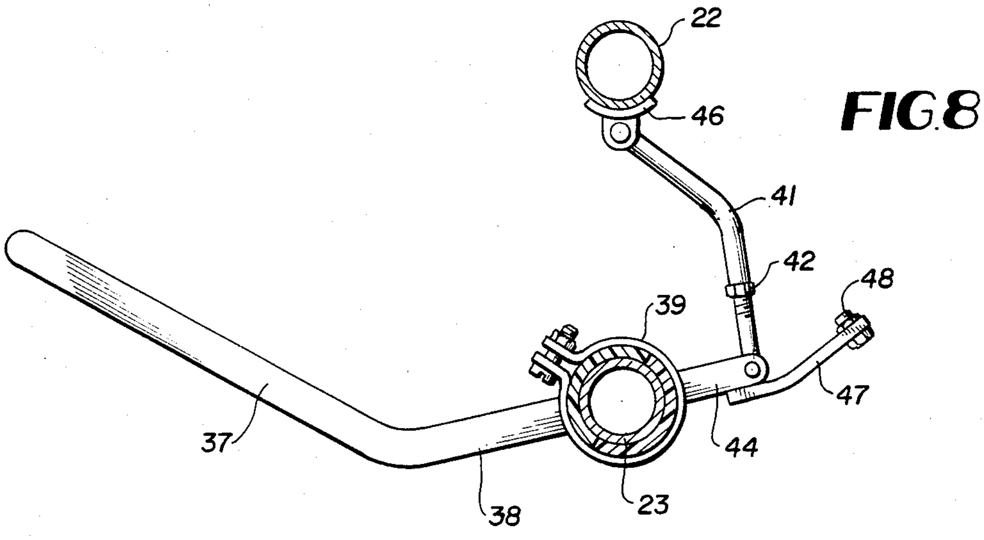
FIG.8
FIG.9
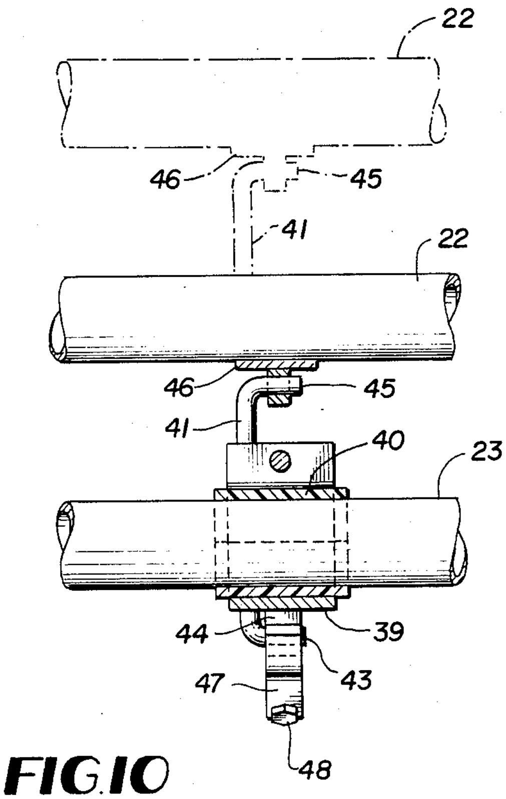
FIG.10
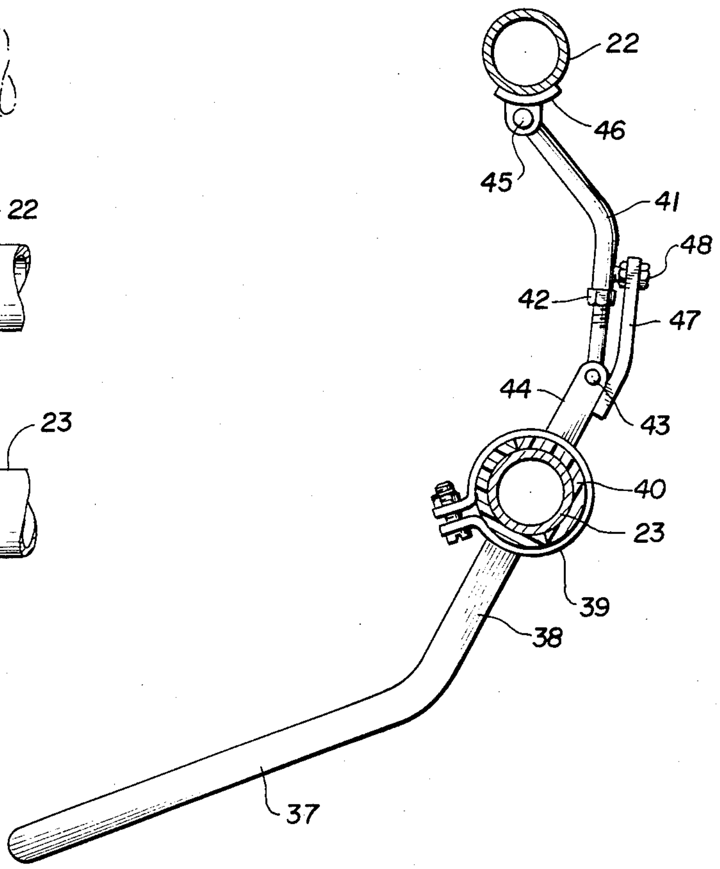

WHEELCHAIR WIDTH ADJUSTER

BACKGROUND OF THE INVENTION

The ever-increasing accessibility to numerous facilities by the handicapped using wheelchairs demands chairs having greater convenience of operation and greater versatility of use.

One very common problem encountered by wheelchair users is the difficulty and sometimes the impossibility of the chair occupant passing through a doorway or other passageway which is narrower than the chair when the chair is fully extended in its normal use width.

The prior art contains teachings of means to adjust the widths of wheelchairs but generally these devices are rather costly and of a nature requiring that they be built-into the chair by the manufacturer. A more simplified device for adjusting the width of a folding wheelchair is disclosed in U.S. Pat. No. 4,264,085, issued to Volin. This patented device involves a hand crank and screw shaft adjuster which operates in conjunction with a folding hinge across the chair transversely between its two vertical side frames. Turning the crank in one direction results in narrowing the chair width. The device can be operated by the chair occupant and can be installed on the wheelchair readily by the owner of the chair instead of by the manufacturer.

The objective of the present invention is to provide a wheelchair width adjuster of an even simpler and less expensive nature than the device disclosed in the above Volin patent. The present invention is embodied in a simple manual hand lever pivotally installed on one side frame of the chair and operable in a swinging mode initiated by the chair occupant to cause partial lateral folding of the chair seat and chair frame to provide greater mobility through restricted passageway. The device can be provided to chair users as an attachment kit for existing chairs which can easily be installed by chair owners. It is very efficient and quite inexpensive compared to all known prior art devices. The device requires little effort to operate and is entirely safe.

Other objects and advantages of the invention will become apparent during the course of the following detail description.

BRIEF DESCRIPTION OF THE DRAWINGS

FIG. 4 is an enlarged fragmentary side elevation of the width adjusting lever and associated components of the chair.

FIG. 5 is a fragmentary vertical section taken on line 5—5 of FIG.4 showing the width adjusting lever in the active width reducing position.

FIG. 6 is a view similar to FIG. 5 showing a modification.

FIG. 7 is a vertical section taken through a modified form of lever operated chair width adjuster with the chair in the full width mode.

FIG. 8 is a similar view showing the width adjusting lever in an intermediate position.

FIG. 9 is a similar view showing the lever in the full active position to reduce the width of the chair.

FIG. 10 is an enlarged fragmentary section taken on line 10—10 of FIG. 7.

DETAILED DESCRIPTION

Figure 1:
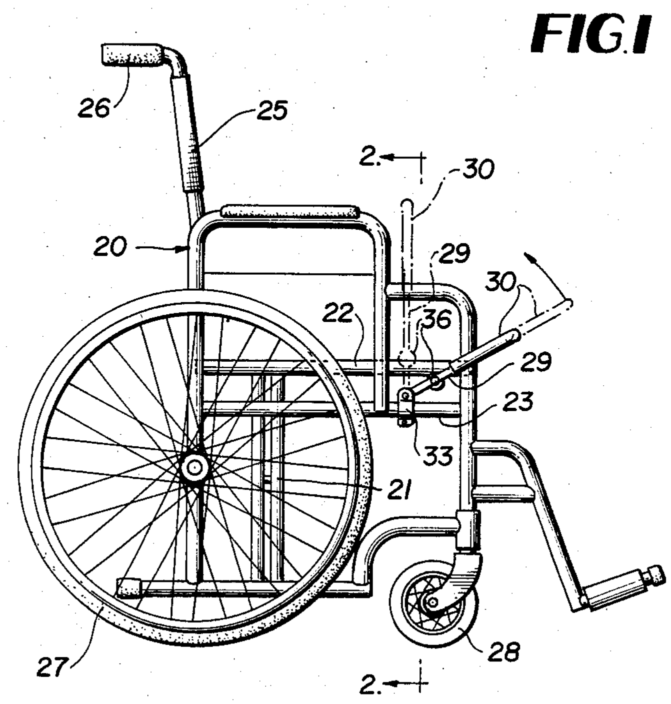
FIG. 1 is a side elevation of a wheelchair equipped with a manual width adjuster according to the present invention.
Figure 2:
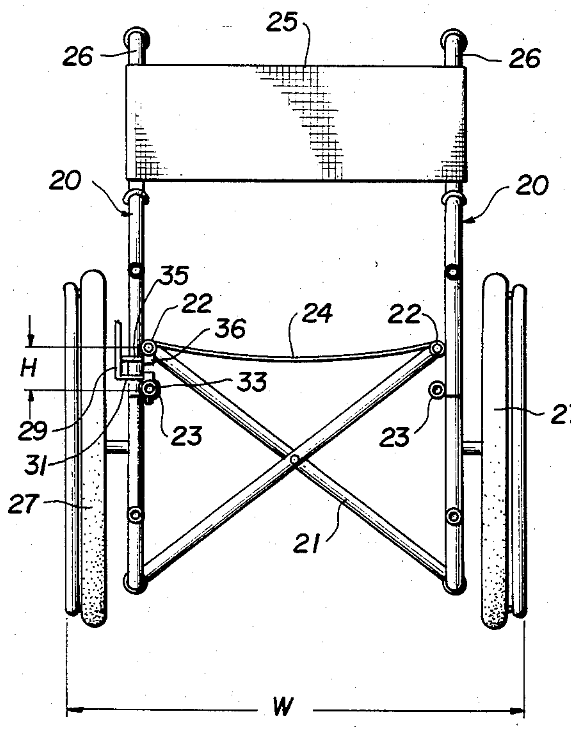
FIG. 2 is a vertical section taken on line 2—2 of FIG. 1 showing the chair in a full width mode.
Figure 3:
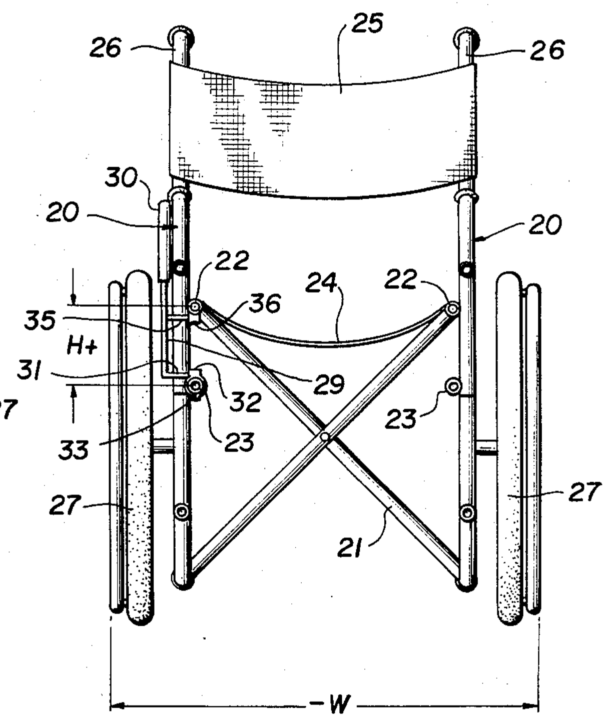
FIG. 3 is a similar view showing the chair in a reduced width state caused by operation of the width adjusting lever.

Referring to the drawings in detail wherein like numerals designate like parts, a conventional wheelchair as depicted in FIGS. 1 through 3 comprises a pair of vertical side frame 20 which are interconnected at their bottoms by a transverse folding X-frame 21. The top of the X-frame is connected to a pair of parallel fore and aft extending seat support tubes 22 which can move vertically relative to a pair of fixed parallel fore and aft chair body tubes 23 below them on the side frame 20. The tubes 23 are fixed to and rigid with the two side frames 20. A flexible seat web 24 is connected with and suspended between the two movable tubes 22 and a flexible backrest web 25 is similarly connected between the two guiding handle bars 26 of the wheelchair. The main propulsion and support wheels 27 of the chair are conventionally journaled on the side frames 20 close to and outwardly of the latter and caster wheels 28 are carried by the bottoms of the two side frames ahead of the main wheels 27, as shown.

In a preferred form of the invention, FIGS. 1 through 6, a chair width adjuster in the form of a fore and aft vertically swinging hand lever 29 is provided having an extensible and retractable telescoping handle 30 which is extended when the lever 29 is pulled rearwardly by the chair occupant to reduce the chair width and is retracted when the lever is in the normal forward position so as to be out of the way of the chair occupant.

The manual lever 29 is installed on one side frame 20 only immediately outwardly of the same, FIG. 3. A bottom short transverse extension 31 of the hand lever 29 extends laterally inwardly and forms a pivot axle for the lever which is journaled in a bearing sleeve 32 fixed to the top of a clamp 33 which tightly embraces the adjacent chair body tube 23 at one side of the chair. The split clamp 33 is secured to the tube 23 by bolting means 34 so that the adjusting lever can be readily installed on and removed from the chair by the chair user.

Above and parallel to the axle extension 31 and fixed on the lever 29 is a lifting roller support axle 35 on which is freely journaled a cylindrically concave lifting roller 36 which engages the lower side of the adjacent seat support tube 22 in a stable manner.

In the use of the device, the handle 30 will normally be collapsed over the lever 29, FIG. 4, while the wheelchair is in a full width mode, as shown in FIG. 2. The weight of the occupant on the seat 24 tends to spread the X-frame 21 laterally and therefore biases the chair to the full width position. When in such position, the seat support tubes 22 are in down positions relatively near and above the fixed parallel tubes 23 and the lever 29 is angled forwardly steeply as shown in solid lines in FIGS. 1 and 4. If desired, the lever 29 while in this normal stowed position can be engaged with a releasable holding clip not shown on the underlying tube 23, or the lever can be allowed simply to gravitate downwardly until the roller 36 rests on the top of tube 23.

When the chair occupant wishes to reduce the width of the chair several inches as depicted in FIG. 3, the telescopic handle 30 is extended and the lever 29 is swung upwardly and rearwardly toward a vertical position shown in dotted lines in FIGS. 1 and 4. During this movement, the lifting roller 36 acting on the bottom of seat support tube 22 elevates this tube away from the fixed tube 23 and, in so doing, the X-frame 21 is caused to partly fold laterally thus pulling together the two side frames 20 and wheels 27 to reduce the width of the chair. During this activity, the contoured shape of the lifting roller 36 assures constant and positive engagement with the tube 22 as the latter is being lifted.

When the lever 29 reaches a substantially vertical position, the roller axle 35 is vertically above the lever pivot axle 31 in a dead center relationship, whereby the lever will tend to hold the chair at its reduced width until the lever is pushed forwardly and downwardly by the occupant. If desired, a fixed stop element for the lever in the upright position, not shown, can be provided on the chair. When the lever 29 is pushed forwardly, the occupant's weight on the seat web 24 will tend to automatically return the chair to its normal width and will also return the lever 29 to its normal down position. The device is extremely simple and economical in construction, convenient and reliable in operation and safe.

A variant of the preferred form of the invention is shown in FIG. 6 wherein the contoured roller 36' and clamp 33' are reversed relative to the tubes 22 and 23. The roller 36' is journaled on the lower axle extension 31 of the lever 29 and the upper axle extension 35 is journaled in the bearing sleeve 32' fixed to the clamp 33'. The roller 36' bears on top of the fixed tube 23 of the chair. When the lever 29 is pivoted on the axis of sleeve 32', the roller 36 pressing downwardly on the fixed tube 23 effects the result of elevating the tube 22 to reduce the width of the chair exactly as described previously, except for the fact of the reversal of the roller and clamp with respect to the tubes 22 and 23.

FIGS. 7 to 10 show a second embodiment of the invention in which a manual lever 37 operable to reduce the width of the wheelchair is provided on one side of the chair and is swingable in a vertical plane perpendicular to the axis of and around the axis of the tube 23 instead of fore and aft as with the lever 29.

The lever 37 includes an elbow extension 38 attached to a clamp 39 containing a dry lube bushing 40, such as a nylon bushing, rotatable around the tube 23. An adjustable length elbow connecting link 41 having a screw-threaded adjustment means 42 is pivotally attached at 43 to a short arm extension 44 on the rotatable clamp 39 at its side away from the extension 38.

The other end of the link 41 is pivoted at 45 to a curved shoe 46 fixed to the bottom of the tube 22. A rigid stop arm 47 is secured to the arm extension 44 and extends beyond the latter and carries a screw stop 48. Pivots 43 and 45 are formed on said link by opposite end short transverse pivot extensions.

When the wheelchair is at full width, FIG. 2, the tubes 22 of seat 24 are relatively near the fixed tubes 23 and the width adjusting lever 37 is in a near upright position, FIG. 7, and is biased in this position by the weight of the chair occupant. The elbow link 41 is relatively near the tube 23 and generally parallel to lever extension 38.

To narrow the chair, the occupant pushes downwardly on the lever 37 which rotates with the clamp 39 through the intermediate position of FIG. 8 to the down position of FIG. 9 where the chair is in the narrowed state. The lever rotates around the axis of the fixed tube 23 and the movable tube 22 is lifted to cause partial folding of the X-frame 21 exactly as described in the prior embodiment. In FIG. 8, the link 41 is roughly perpendicular to the extension 44 and in the final position, FIG. 9, the link 41 extends roughly longitudinally of the extension 44. In this final position, the screw stop 48 carried by the lever 37 has swung around and engaged the inner side of link 41 to limit the downward stroke of the lever 37. In the position of FIG. 9, where the wheelchair has been narrowed, the lever 37 can be caused to engage a suitable clip or other releasable holding device, not shown. The lever 37 tends to be biased toward the full chair width position of FIG. 7 by the weight of the chair occupant.

The advantages present in both simple embodiments should be apparent to those skilled in the art.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In a laterally folding wheelchair of the type having a pair of vertical frame sides interconnected by a vertically folding X-frame, the frame sides including fixed horizontal fore-to-aft bars and parallel vertically movable fore-to-aft seat web support bars connected with the top of said X-frame, the improvement comprising a vertically swingable manual lever swiveled on one of the fixed horizontal fore-to-aft bars and being operable in a vertical plane at right angles to the vertical plane of the adjacent frame side of the wheelchair, the manual lever including a comparatively long handle portion which extends upwardly adjacent to the outer side of one vertical frame side of the wheelchair in ready reach of a chair occupant when the chair is in a full width condition, the manual lever further including a comparatively short power extension, a link having one end pivotally attached to said power extension and having its opposite end pivotally attached to one of said vertically movable fore-to-aft seat web support bars and being bodily movable in a vertical plane in response to movement of said manual lever downwardly by a chair occupant to elevate said seat web support bar, and a substantially rigid stop element secured to said short power extension and projecting beyond one end of the same and being in a common vertical plane with said link and contacting one side of the link to limit downward movement of said manual lever by an occupant of the wheelchair to reduce the width of the wheelchair.

2. In a laterally folding wheelchair as defined in claim 1, and a ring clamp secured to said manual lever between its long handle portion and its power extension and being swiveled on said one fixed horizontal fore-to-aft bar.

3. In a laterally folding wheelchair as defined in claim 2, and a dry lube bearing between said ring clamp and said one fixed horizontal fore-to-aft bar.

4. In a laterally folding wheelchair as defined in claim 1, and said manual lever including sections of its long handle portion disposed at an obtuse angle, one such section being coaxial with said short power extension of the manual lever.

5. In a laterally folding wheelchair as defined in claim 4, and said stop element comprising a stop arm including a forward angled portion which is substantially parallel to said one side of the link which is engaged by the stop arm to limit downward movement of the manual lever.

6. In a laterally folding wheelchair as defined in claim 5, and said link being a length adjustable link, and an adjustable screw stop on the stop arm near its forward end.

7. In a laterally folding wheelchair as defined in claim 6, and said link having opposite end short transverse pivot extensions pivotally coupled with said power extension and said movable fore-to-aft seat web support bar.

8. In a laterally folding wheelchair as defined in claim 1, and said long handle portion lying laterally outwardly of the adjacent frame side of the wheelchair while extending upwardly while the wheelchair is in the full width condition, said power extension and rigid stop element then projecting downwardly and laterally inwardly of the adjacent frame side and said link extending upwardly adjacent to the interior of said frame side and defining an acute angle with the manual lever.

* * * * *